Dec. 17, 1940.                M. LANGHAUS                2,225,058
                              LATHER MIXER
                         Filed March 15, 1940         2 Sheets-Sheet 2

INVENTOR.
Morris Langhaus
BY
ATTORNEY.

Patented Dec. 17, 1940

2,225,058

UNITED STATES PATENT OFFICE 2,225,058

LATHER MIXER

Morris Langhaus, New York, N. Y.

Application March 15, 1940, Serial No. 324,029

4 Claims. (Cl. 259—10)

This invention relates to lather mixers for use in tonsorial shops, and has for one of its objects the provision of a highly sanitary device for producing soap lather in any desired quantity in a minimum amount of time and without the use of a brush.

Another object of the invention is the provision of a device of the nature referred to, said device comprising a liquid soap container in communication with a mixing chamber therebelow, a valve normally closing the communication between the said container and chamber, a motor driven churner or mixer in the said chamber, and a lever which when depressed will unseat the valve to permit the flow of the liquid soap into the chamber and simultaneously therewith cause the churner to rotate to produce lather and deliver same to the barber's hand through a nozzle extending from the said chamber.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which—

Figure 1:
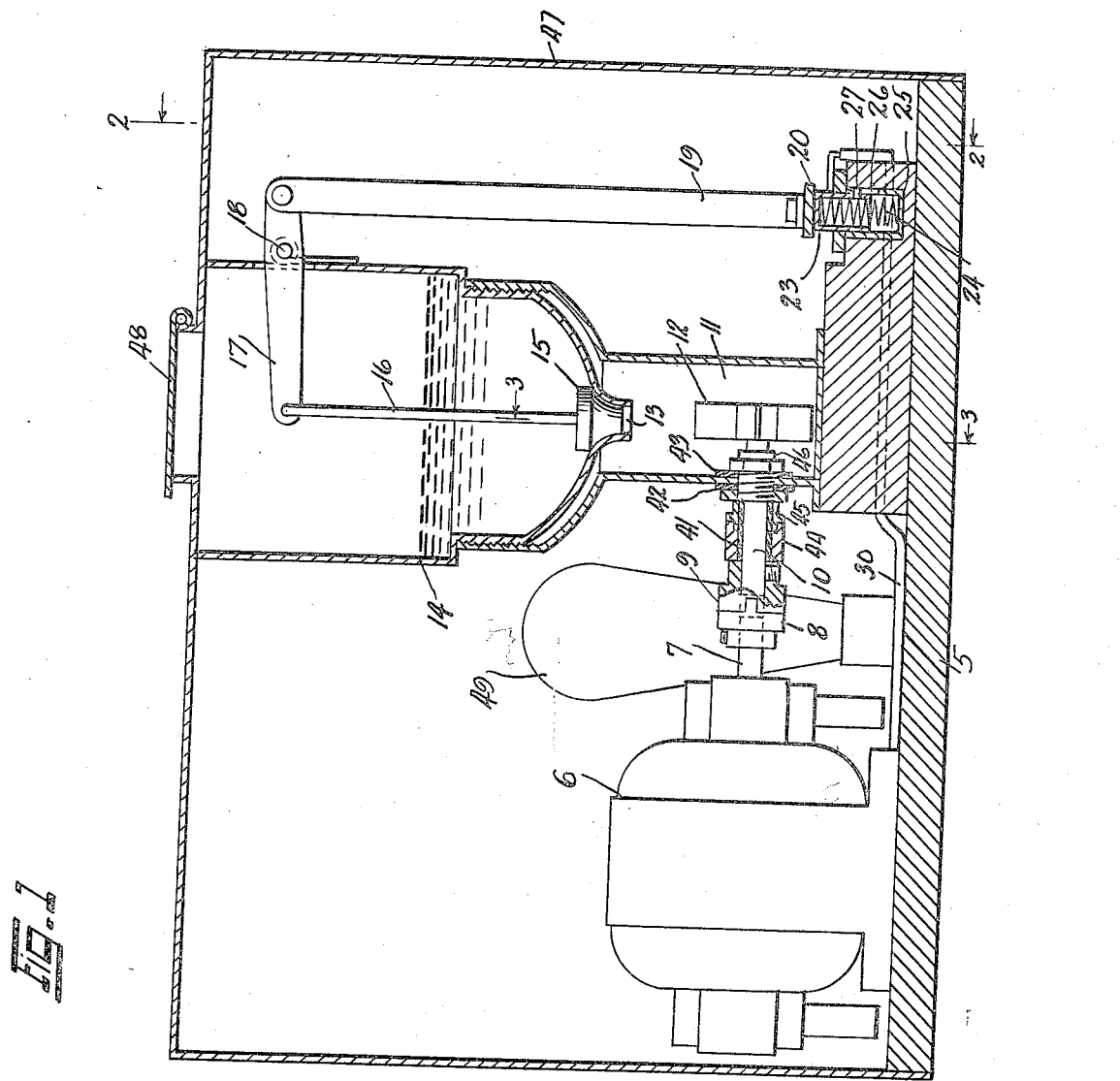
Fig. 1 is a side view partly in section of my improved lather mixer.
Figure 2:
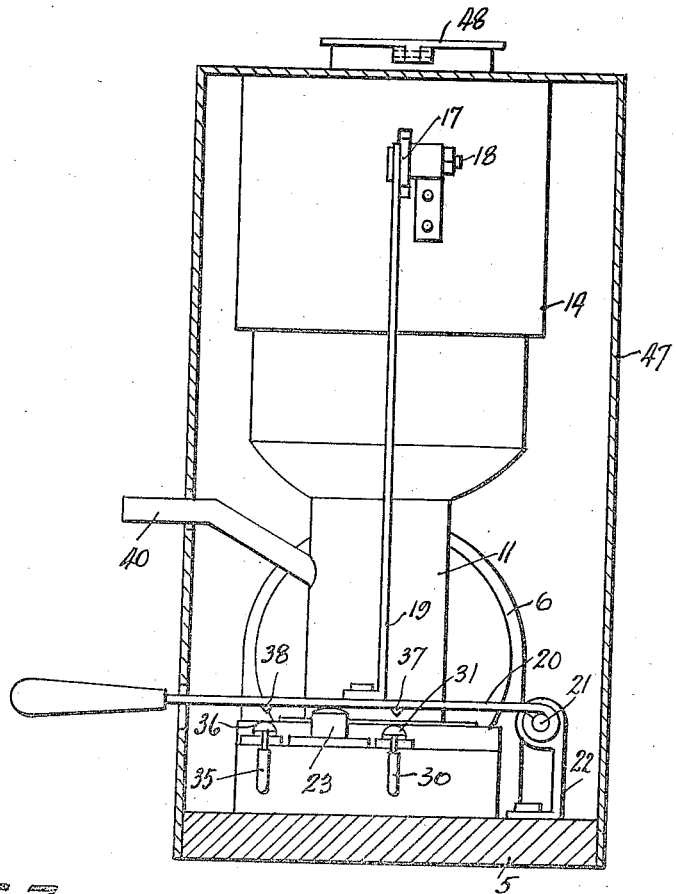
Fig. 2 is a sectional view taken on line 2—2 Fig. 1.
Figure 3:
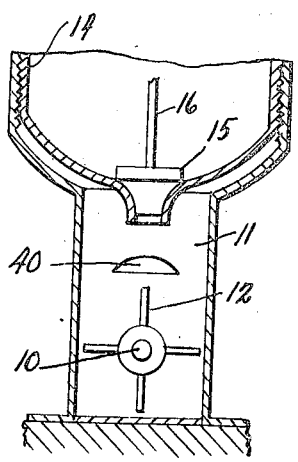
Fig. 3 is a fragmental sectional view taken on line 3—3 Fig. 1.

Referring now to the drawings in detail 5 indicates a base upon which is mounted an electric motor 6 having a shaft 7 upon which there is secured a clutch member 8 in mesh with a second clutch member 9 carried on a shaft 10 which extends into a mixing chamber 11 and which shaft carries a mixer or churner 12.

Directly above the mixing chamber 11 and in communication therewith through a valve opening 13 is a liquid soap container 14. The opening 13 is normally closed by a valve disk or plug 15 from which extends a stem 16 pivotally secured to one end of a lever 17 pivoted at 18. Pivotally secured to the opposite end of the lever 17 is a link 19 the lower end of which is secured to a lever arm 20 pivoted at 21, the said pivot 21 also passing through a bracket 22 secured to the base 5.

Figure 4:
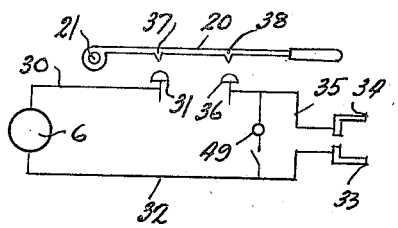
Fig. 4 is a diagrammatic view of the electrical connections.

The lever arm 20 is normally maintained in its upper position by means of a plunger 23 which is pressed upwardly by a coiled spring 24. The said plunger may operate in a cylinder 25 which may be provided with a slot 26 to accommodate a pin 27 extending from the plunger 23. A wire 30 extending from one side of the motor 5 is electrically connected to a terminal 31, the other side of the motor being connected by a lead wire 32 to one leg 33 of an electric plug (see Fig. 4), the second leg 34 of which is connected by a lead wire 35 to a terminal 36. When the plug is connected to a source of electric supply and the lever arm is in its normal upward position the circuit is broken. However, upon the depression of the said lever arm to open or unseat the valve 15 to permit the flow of liquid soap into the mixing chamber 11, contact points 37 and 38 will engage the terminals 31 and 36 to close the electric circuit to run the motor 6 and rotate the mixer 12 to make lather in the chamber 11 which will be delivered to the barber's hand through a nozzle 40 leading outwardly from the said chamber. It will be seen that the hand which depresses the lever arm 20 may receive the lather so that only one hand need be used to operate the device and to receive the lather.

The shaft section 20 which carries the mixing wheel 12 is surrounded by suitable packing material 41 and by gaskets 42 and 43 to make the device leak-proof. The said packing material may be kept in place about the shaft by means of fittings 44, 45 and 46. The entire device is surrounded by an outer casing 47 which at the top thereof is provided with a hinged cover or lid 48 which when open will permit of access to the liquid soap container 14. If desirable an electric lamp 49 may be provided to keep the liquid soap in a slightly heated condition.

From the foregoing, it will be seen that I have provided a simple, sanitary, economical and efficient lather mixer which can be operated to almost instantaneously produce lather and deposit same upon the hand upon the depression of the operating lever used in connection with the device.

It will be understood that instead of the switch shown and described, any other suitable type of switch may be used to open or close the motor circuit.

Having described my invention what I claim as new and desire to secure by Letters Patent is:

1. A device for producing lather from liquid soap comprising a liquid soap container, a mixing chamber in communication therewith, a valve interposed between the container and the mixing chamber, a mixer in the mixing chamber, a pair of electric terminals, a motor for operating the mixer normally in open circuit with the terminals, a lever pivotally mounted for vertical swinging movement at one side of the mixing chamber and constituting means for bridging the terminals, spring means for normally holding the lever out of bridging engagement with the terminals, a rocker bar for actuating said valve pivotally carried by said container, and a link connecting said rocker bar with said lever for accomplishing opening of the valve when the lever is moved into bridging engagement with the electric terminals.

2. A device for producing lather from liquid soap comprising a base, a mixing chamber rising from said base, a container for liquid soap over said mixing chamber having an outlet at its bottom for delivering soap into the mixing chamber, a valve for controlling flow of soap through the outlet having a stem extending vertically in the container, a rocker bar pivotally mounted and extending horizontally through the peripheral wall of the container with its inner end connected with the upper end of the valve stem, a mixer in the mixing chamber, a pair of electric terminals, a motor for operating the mixer normally in open circuit with the terminals, a bearing bracket carried by said base, a lever pivotally carried by said bearing bracket and extending horizontally over the terminals and yieldably held out of bridging engagement therewith, and a link connecting said lever with the outer end of said rocker bar to tilt the rocker bar and move the valve to an opened position when the lever is depressed for bridging engagement with the electric terminals.

3. A device for producing lather from liquid soap comprising a base, a mixing chamber carried by said base, a container for liquid soap over said mixing chamber having an outlet at its bottom for delivering soap into the chamber, a pair of electric terminals carried by said base, a mixer in the mixing chamber, a motor for operating the mixer normally in open circuit with the terminals, a valve for controlling flow of soap through the outlet having a stem extending vertically in the container, a rocker bar pivotally mounted and passing through the peripheral wall of the container with its inner end connected with the valve stem to open the valve when the rocker bar is tilted in one direction, a lever pivotally mounted and extending horizontally over the electric terminals for bridging the terminals when the lever is depressed, spring means carried by the base under the lever for normally holding the lever out of bridging engagement with the terminals, and a link connecting said lever with the outer end of the rocker bar.

4. A device for producing lather from liquid soap comprising a base, a mixing chamber carried by said base, a container for liquid soap over said mixing chamber having an outlet at its bottom for delivering soap into the chamber, a pair of electric terminals carried by said base, a mixer in the mixing chamber, a motor for operating the mixer normally in open circuit with the terminals, a valve for controlling flow of soap through the outlet having a stem extending vertically in the container, a rocker bar pivotally mounted and passing through the peripheral wall of the container with its inner end connected with the valve stem to open the valve when the rocker bar is tilted in one direction, a lever pivotally mounted and extending horizontally over the electric terminals for bridging the terminals when the lever is depressed, a link extending upwardly from said lever with its upper end pivoted to the outer end of the rocker bar, and means for yieldably holding the lever out of bridging engagement with the terminals consisting of a cup mounted in the base under the lever, a plunger slidable vertically in said cup, and a spring in the cup urging the plunger upwardly into engagement with the lever and normally holding the lever out of engagement with the terminals.

MORRIS LANGHAUS.